(No Model.)
G. W. WASHBURN.
EAR JEWEL.
No. 396,788. Patented Jan. 29, 1889.
Fig. 1.
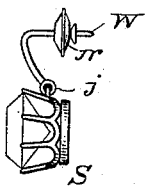
Fig. 2. Fig. 3. Fig. 4. Fig. 5.
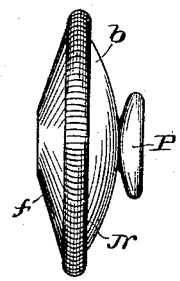 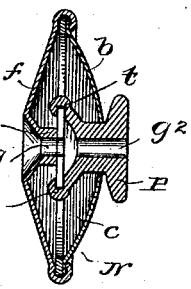 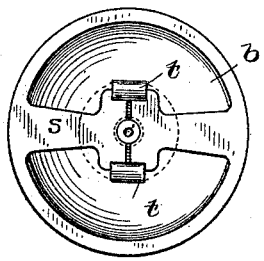 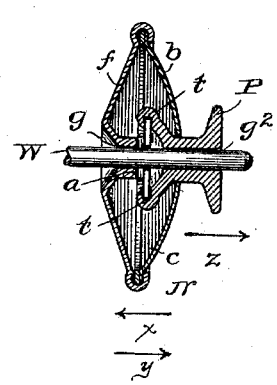
Fig. 7.
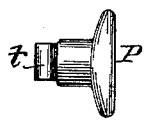
Fig. 6. Fig. 8.
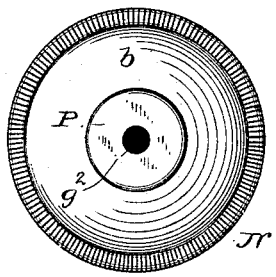 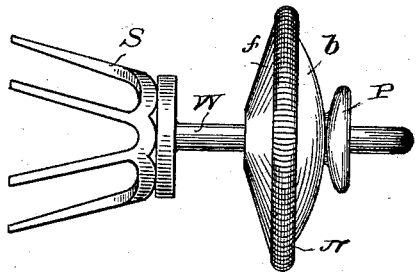
Witnesses,
H. A. Lamb
Lot Phillips
Inventor
GEORGE W. WASHBURN
Attorney.

UNITED STATES PATENT OFFICE.

GEORGE W. WASHBURN, OF WEST NEW BRIGHTON, NEW YORK.

EAR-JEWEL.

SPECIFICATION forming part of Letters Patent No. 396,788, dated January 29, 1889.

Application filed July 13, 1888. Serial No. 279,825. (No model.)

*To all whom it may concern:*

Be it known that I, GEORGE W. WASHBURN, a citizen of the United States, and a resident of West New Brighton, in the State of New York, of the firm of Sexton Bros. & Washburn, No. 41 Maiden Lane, New York city, have invented a new and useful Improvement in Ear-Jewels, &c., of which the following is a specification.

This invention relates to a certain class of fastenings for ear-jewels, button-studs, and the like, heretofore known as "screw" or "screw-and-nut" fastenings; and it consists in certain novel features of construction or combinations of parts, hereinafter set forth and claimed. Its objects are, first, to provide for quickly adjusting the nut at the fastening operation without sacrificing security; secondly, to facilitate quickly unfastening and detaching the nut, this provision serving also to dispense with the screw-thread on the ear wire or post, which may consequently be very small; and, thirdly, to provide for so unfastening the nut in the act of grasping it to retract it.

A sheet of drawings accompanies this specification as part thereof.

Figure 1 of the drawings represents an elevation of a pendant ear-jewel embodying the several features of this invention, and Figs. 2 to 7, inclusive, represent magnified views of portions thereof, Fig. 2 being an edge view of the nut detached; Fig. 3, an axial section thereof; Fig. 4, a face view with the front plate of the nut removed; Fig. 5, a sectional view illustrating the fastening and unfastening operations; Fig. 6, a back view of the nut, and Fig. 7 an edge view of the "pull-piece." Fig. 8 represents a magnified elevation of the metallic parts of a stud-jewel for use in the ears or elsewhere, having the same fastening device.

Like letters of reference indicate corresponding parts in the several figures.

The nut N of each of the jewel-fastenings represented by the drawings is provided with an internal spring-plate, $s$, of steel or the like, in the form of an annular disk having inwardly-projecting rearwardly-flexible arms, the inner ends of which are so shaped as to form a central opening, $o$, Fig. 4, somewhat smaller in its shorter diameters than the smallest wire it is designed to coact with. Each nut comprises also a front plate, $f$, and a back plate, $b$, united at the perimeter of the nut, with the margin of the spring-plate between the margins of the front and back plates, as shown in Figs. 3 and 5, with a space or chamber, $c$, behind the spring-plate, formed by the back plate, within which the arms of the spring-plate move freely, and an abutment, $a$, on the front plate, against which said arms abut in effective position, as illustrated, respectively, by said Figs. 5 and 3. Each nut has also front and back guide-bores, $g\ g^2$, large enough to freely admit the largest wires to which the nut is adapted. Consequently when the nut N is applied face forward on the end of a wire, W, the nut can be moved bodily forward to proper position, as represented by arrow $x$ in Fig. 5, and there simply released, any like or accidental reverse movement (represented by arrow $y$) being prevented by the endwise impact of the arms of the spring-plate $s$ upon the wire and their support against forward flexure by the abutment $a$.

Each nut N is further provided with a pull-piece, P, by the aid of which the nut can be retracted and detached as quickly as it is advanced to position, as illustrated by arrow $z$ in Fig. 5. This pull-piece (shown detached in Fig. 7) contains the back guide-bore, $g^2$, of this nut, and occupies by its shank a central hole in the back plate, $b$. Its inner end is bifurcated and provided with terminal claws $t$, which embrace the inner ends of the arms of the spring-plate $s$, as shown in Figs. 3 to 5, so as to adapt it to simultaneously retract the arms to release the nut. Its outer end is a head having a convex back or outer surface opposed to the convex outer surface of the back plate, $b$, and by forcing the nails of the thumb and an opposing finger into the space between the two when the parts are in normal position, as shown in Figs. 1, 2, 3, and 8, the spring-plate arms are retracted in the act of grasping the pull-piece P, and the nut N may thus be shifted on or removed from the wire W with the greatest facility. I am thus enabled to use plain wires, as indicated in Figs. 1, 5, and 8, and consequently to apply the nut in some places where a screw-threaded wire is impracticable, as in scarf-pins.

In the species illustrated by Figs. 1 to 7 the wire W is a peculiarly-shaped ear-wire connected with a pendant jewel-setting, S, by a suitable loose or swing joint, *j*. The wire has a straight horizontal portion which passes through the pierced lobe of the ear, and to which the nut N is applied, and a recurved depending portion terminating in one part of said joint. This depending portion may obviously be bent with facility after the ear-jewel is finished, so as to fit it to ears pierced high or low or of peculiar shape.

In the species illustrated by Fig. 8 the wire W is a "post" rigidly united with a setting, S.

Other like modifications within the scope of my invention will suggest themselves to those skilled in the manufacture of such articles.

Having thus described my said improvement in ear-jewels, &c., I claim as my invention and desire to patent under this specification—

1. The combination, with an ear-wire or the like, of a hollow fastening-nut comprising an internal spring-plate in the form of an annular disk having inwardly-projecting and rearwardly-flexible arms which grasp the wire between their ends, and annular front and back plates united at the perimeter of the nut, with the margin of said spring-plate between their margins, said front plate having an abutment for said arms on its inner side and said back plate forming a flexing-space behind said arms, substantially as hereinbefore set forth.

2. In combination with an ear-wire or the like, of plain wire, a hollow fastening-nut comprising an internal spring-plate having inwardly-projecting and rearwardly-flexible arms which grasp the wire between their ends, and a rearwardly-projecting pull-piece connected with said arms for retracting them to release the nut, substantially as hereinbefore set forth.

3. In combination with an ear-wire or the like, a hollow fastening-nut provided with an internal spring-plate having inwardly-projecting arms which grasp the wire between their ends, a pull-piece connected at its inner end with said arms and having at its protruding rear end a convex-backed head, and a back plate having a convex outer surface opposed to the latter, substantially as hereinbefore set forth.

GEO. W. WASHBURN.

Witnesses:
GEO. S. MIDDLEBROOKE,
WILLIAM B. SHOVE.